United States Patent
Gürsu et al.

(10) Patent No.: US 12,267,865 B2
(45) Date of Patent: Apr. 1, 2025

(54) DYNAMIC RANDOM ACCESS OCCASION CONFIGURATION AFTER A CONTENTION

(71) Applicant: Nokia Technologies Oy, Espoo (FI)

(72) Inventors: Halit Murat Gürsu, Munich (DE); Marco Maso, Issy les Moulineaux (FR); Daniela Laselva, Klarup (DK)

(73) Assignee: Nokia Technologies Oy, Espoo (FI)

( * ) Notice: Subject to any disclaimer, the term of this patent is extended or adjusted under 35 U.S.C. 154(b) by 442 days.

(21) Appl. No.: 17/955,022

(22) Filed: Sep. 28, 2022

(65) Prior Publication Data

US 2023/0189331 A1 Jun. 15, 2023

Related U.S. Application Data

(60) Provisional application No. 63/288,033, filed on Dec. 10, 2021.

(51) Int. Cl.
*H04W 74/02* (2009.01)
(52) U.S. Cl.
CPC .................... *H04W 74/02* (2013.01)
(58) Field of Classification Search
CPC ............ H04W 74/006; H04W 74/02; H04W 74/0833; H04W 74/0836; H04W 74/083
See application file for complete search history.

(56) References Cited

U.S. PATENT DOCUMENTS

| | | | | |
|---|---|---|---|---|
| 11,678,376 B2 * | 6/2023 | Yang | ................... | H04W 74/006 370/329 |
| 2013/0114515 A1 * | 5/2013 | Koo | ..................... | H04J 11/0023 370/328 |
| 2024/0430953 A1 * | 12/2024 | Jung | ................. | H04W 74/0838 |
| 2025/0007654 A1 * | 1/2025 | Li | ..................... | H04W 74/0833 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

(Continued)

*Primary Examiner* — Liton Miah
(74) *Attorney, Agent, or Firm* — Nokia Technologies Oy

(57) ABSTRACT

In accordance with example embodiments of the invention there is a method and apparatus to perform at least: receiving from a serving cell of a communication network information comprising a first contention based random access channel configuration and a second random access channel configuration associated with at least a first service, wherein the second random access channel configuration is inactive and whose activation is associated with at least one activation timer; transmitting a first physical random access channel message using a resource of the first contention based random access channel configuration; determining a condition holds after reception of a network message and activating a resource of the second random access channel configuration based on the at least one activation timer; and based on the determining, transmitting a second physical random access channel message using a resource of the second random access channel configuration.

20 Claims, 8 Drawing Sheets

(56) References Cited

OTHER PUBLICATIONS

"3rd Generation Partnership Project; Technical Specification Group Radio Access Network; NR; Physical channels and modulation (Release 16)", 3GPP TS 38.211, V16.6.0, Jun. 2021, pp. 1-134.
"RACH partitioning for Rel-17 features", 3GPP TSG-RAN WG2 #114e, R2-2104933, Agenda: 8.18, Ericsson, May 19-27, 2021, pp. 1-6.
"RACH indication and partitioning", 3GPP TSG RAN WG2 #115-e, R2-2108210, Agenda: 8.18, Huawei, Aug. 9-27, 2021, pp. 1-10.
"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

\* cited by examiner

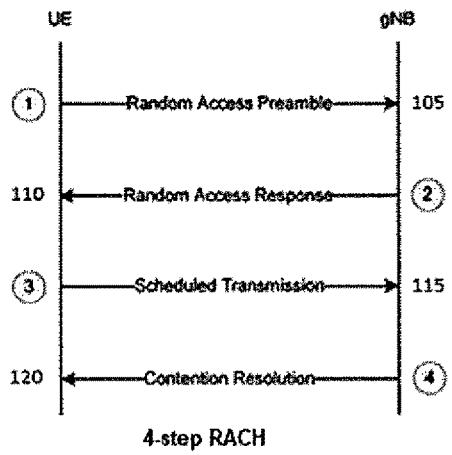
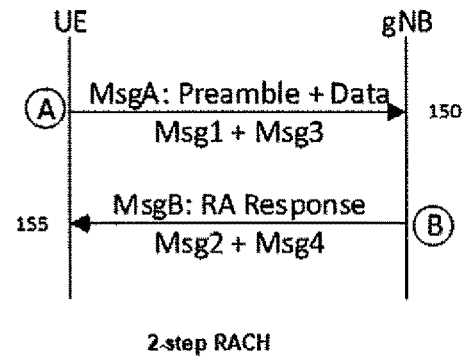

| Feature | RACH indication / reason for partitioning for contention based |
|---|---|
| CovEnh | To indicate the need for coverage enhancement (e.g., for request of MSG3 repetition) to the network |
| Slicing | To indicate the need for prioritization and isolation of a slice (including RACH isolation) to the network |
| RedCap RRC Idle/Inactive | To indicate the reduced capabilities of the UE to the network so that the network can adapt subsequent transmissions (as compared to a regular UE) |
| RedCap RRC Connected | This allows the network to limit the impact of RedCap UEs to other UEs |
| SDT | To request a larger MSG3 size (or MSGA size in case of 2-step RA) and to indicate the small data transmission (SDT) procedure (as compared to regular MSG3/MSGA size for non-SDT/legacy resume). |

| Feature | RACH indication / reason for partitioning for contention free |
|---|---|
| Slicing | To isolate or prioritize access of one slice from another a UE maybe configured with two different CFRA resources for separate QoS. |
| RedCap / CovEnh | Feature specific PRACH resources may be needed due to physical layer constraints |

FIG. 2

DYNAMIC RANDOM ACCESS OCCASION CONFIGURATION AFTER A CONTENTION

RELATED APPLICATION

This application claims priority from U.S. Provisional Application No. 63/288,033, filed on 10 Dec. 2021, which is incorporated herein by reference in its entirety.

TECHNICAL FIELD

Exemplary embodiment of the invention as described herein relate generally to wireless communication networks and, more specifically, relates to random access channel (RACH) communications.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CG Configured Grant
CovEnh Coverage Enhancement
CE Coverage Enhancement
FR1 Frequency Range 1
FR2 Frequency Range 2
EDT Early Data Transmission
PRACH Physical Random-access Channel
PRB Physical Resource Block
PSS Primary Synchronization Signal
PUR Periodic Uplink Resources
PUSCH Physical Uplink shared channel
RA Random-access
RACH Random-access Channel
RedCap Reduced Capabilities
RNTI Radio Network Temporary Identifier
RO RACH Occasion
RRC Radio Resource Control
RSRP Reference Signal Received Power
SDT Small Data Transmission
SI System Information
SIB System Information Block
SSB Synchronization Signal block
SSS Secondary Synchronization Signal
UE User Equipment In a wireless network, particularly a cellular network, a user equipment (UE) is a wireless, typically mobile device that connects to the network. In order to connect to the network, the UE uses a procedure on a random-access channel (RACH).

Initially, the UE uses a "contention based random access", where there are a certain number of preambles UEs are allowed to use for the RACH procedure, and the UE randomly selects one of these. This is "contention based" because another UE could also be attempting to access the network at the same time and also randomly select the same preamble. The access to the network is made during a RACH occasion (RO).

Both UEs may therefore use the same preamble, which causes contention. In the case of contention, the RACH procedure provides a number of options for the UE to again attempt to access the network during a subsequent RO.

Example embodiments of the invention work to address such contention and improve RACH procedures.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 1A shows a 4-Step RACH Procedure;
FIG. 1B shows a 2-step RACH procedure;
FIG. 2 shows features of RACH indications and reasons for partitioning.

DETAILED DESCRIPTION

Figure 3:
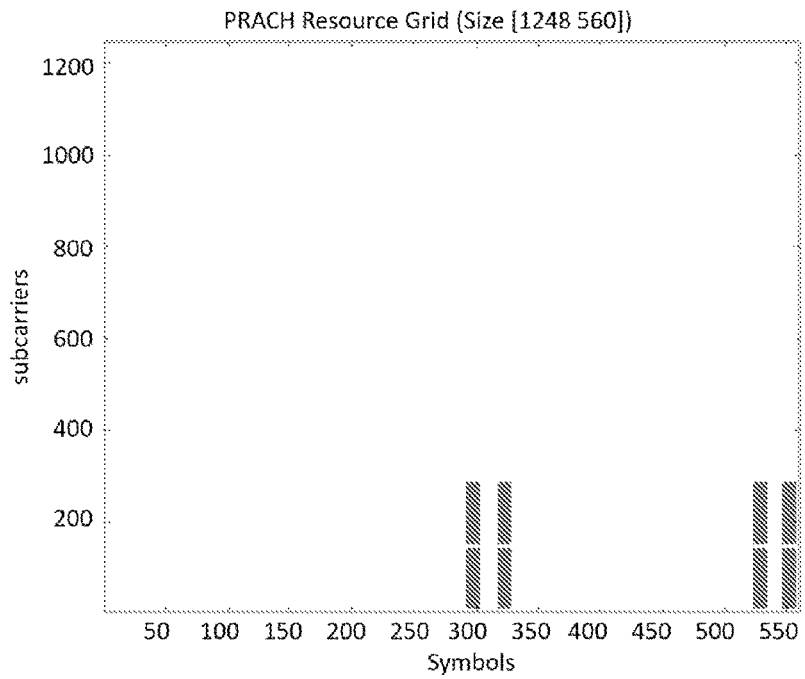
FIG. 3 shows PRBs allocated for a PRACH configuration with 8 RACH occasions.

Example embodiments of this invention provide improvements to the random-access procedure, at least for initial access in 5G NR or other radio technologies.

Particularly, it relates to the ongoing RAN2 discussion on RACH partitioning for features at the time of this application. The partitioning of the RACH resources was defined in NR specification with the introduction of the 2-step RACH procedure (in addition to the 4-step RACH supported in prior releases). Both procedures are shown in FIG. 1.

FIG. 1A shows a 4-Step RACH Procedure. As shown in step 105 of the 4-step RACH procedure of FIG. 1A, identified as #1,the UE communicates a random access preamble with the gNB. Then as shown in step 110 of FIG. 1A, identified as #2,the gNB sends to the UE a random access response. At step 115 of FIG. 1A the UE sends to the GNB a scheduled transmission. Then at step 120 of FIG. 1A the gNB sends towards the UE an indication of contention resolution.

FIG. 1B shows a 2-step RACH procedure. As shown in step 150 of FIG. 1B, identified as A, the UE sends towards the gNB a MsgA: preamble and data. Then as shown in step 155 of FIG. 1B, identified as B, the gNB sends towards the UE a MsgB: RA response, a MSG2 and a MSG 4.

The partitioning for 2-step RACH entails that the entire set of RACH resources is partitioned in two pools, each of them dedicated to the corresponding RACH procedure (i.e., 2-step or 4-step RACH). In standards agreements at the time of this application the two pools are broadcast by the gNB using the RACH-ConfigCommonTwoStepRA, information element, which can be even further subdivided via the GroupB-ConfiguredTwoStepRA-r16 IE contained therein. Then, the UE indicates whether it is using 4-step or 2-step RACH in MSGA of 2-step RACH or in MSG1 of 4-step RACH by selecting and transmitting a RACH resource from the corresponding pool of resources.

A further partitioning is between Contention Free (CF) RACH resources and Contention based (CB) RACH resources. As per name of the resources, the contention free RACH resources are dedicated to a given UE, whereas the UEs have to contend for a RACH resource in the Contention based (CB) pool. For the latter case, different UEs may select the same (CB) RACH resource and may end up interfering with each other, leading to a RACH collision and subsequently RACH failure.

At the time of this application further partitioning of the RACH resources is being considered for the standard features at the time of this application listed in FIG. 2 with the aim to enable the network to identify each feature based on the preamble/RO used by the UE or the avoid interference among different RACH using features. FIG. 2 shows features of RACH indications and reasons for partitioning.

The PRACH configuration defines the time and frequency resources that can be used by the UE for random-access and include the RACH resources such as RACH occasions in time (ROs) and RACH preambles. When a UE transmits a PRACH preamble, it transmits with a specific pattern, or sequence, which is a sort of signature. In each NR cell, there are a total of 64 preamble sequences available. In contention based random-access, once the UE determines a suitable RO it will randomly select one of the valid preambles to be transmitted in the RO among the available ones, as configured by NW.

In accordance with standards submissions at the time of this application the partitioning of RACH resources can be achieved either by partitioning the ROs for different features (i.e., different ROs are dedicated to different features) or by partitioning the preambles associated with an RO for different features (i.e., different preambles of an RO are dedicated to different features as currently defined in standards at the time of this application for 2-step and 4-step RACH partitioning) or through allocation of a separate PRACH configuration.

The former approach (ROs dedicated per feature) may introduce delay in the RA procedure, as the UE requiring a feature would need to wait until a valid RO presents itself, with fewer valid ROs available per feature due to the resource splitting.

The latter approach (preambles in an RO dedicated per feature) allows all features to use any RO resulting in a lower RA latency achieved for any service in the cell. However, it limits the number of preambles available per feature. This in turn may increase the RACH collision probability, which is undesired. This can also lead to latency increase, indirectly. Supported cell sizes would also be limited in this case, since an increased cell size requires skipping of cyclic shifts when creating the PRACH preamble sequences, such that larger distances between the cyclic shifts of the PRACH root sequences can be obtained. The number of root sequences is limited by cell planning and inherent mathematical properties of the sequences themselves. The problem of preamble limitation and collision becomes worse the more features are to be separated.

RACH Configuration in 5G NR

As per standards or discussions at the time of this application, the cell broadcasts one Prach-Configuration Index indicating the set of available resources for the PRACH in the time domain (PRACH occasions, ROs), including in which subframes of the SFN (System Frame Number) the ROs fall. It is noted that the SFN can range from 0 to 1023 in 5G NR, where each SFN identifies a radio frame of 10 ms duration, each of which includes 10 subframes of 1 ms duration. 256 PRACH configurations are defined in these standards for both FR1 and FR2, allowing an RO periodicity ranging between 10 ms and 160 ms.

FIG. 3 shows PRBs allocated for PRACH resources. As shown in FIG. 3 PRBs allocated for PRACH resources are illustrated in a 40 MHz grid of FR2 spectrum when using RO periodicity of 10 ms. It is noted that approximately 3% of the spectrum is used for PRACH resources. While PRACH configuration 14, MSG-1 FDM is set to 2 results in 48 ROs.

Figure 4:
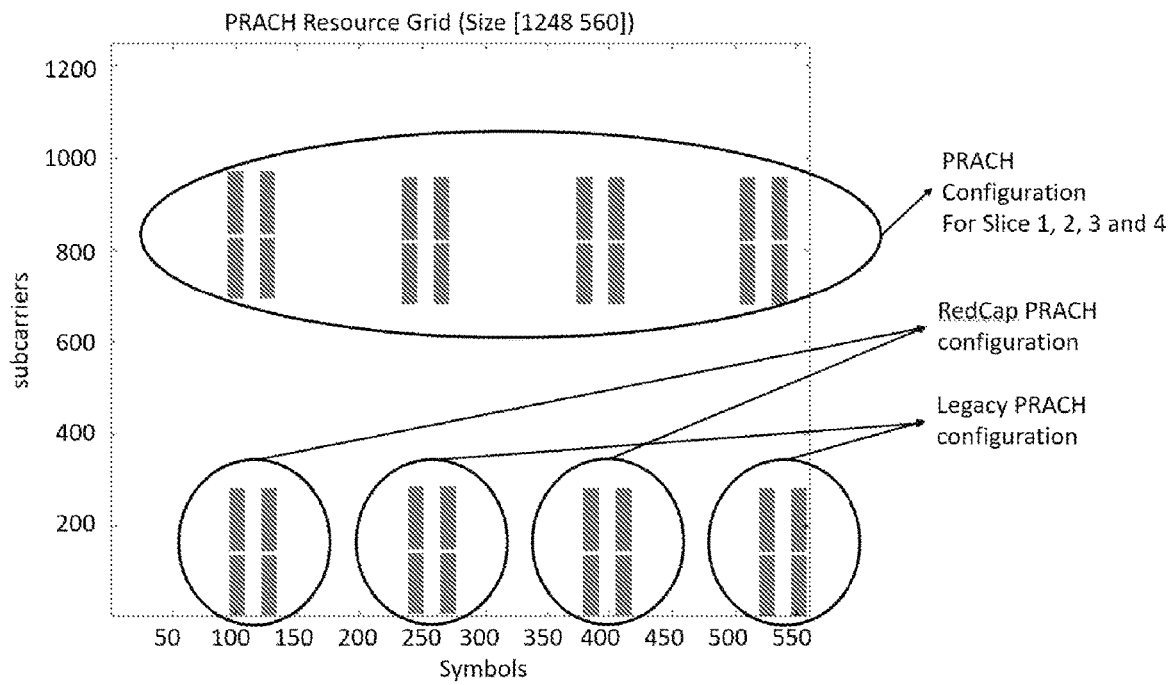
FIG. 4 shows PRBs allocated for a PRACH configuration with 32 RACH occasions; for different features.

FIG. 4 shows a PRACH configuration. As shown in the PRACH configuration of FIG. 4 there are 48 ROs for legacy UEs, 48 ROs for RedCap, 24 ROs each for slice 1, 2, 3 and 4 when using RO periodicity of 10 ms. While approximately 12% of the spectrum is used for PRACH resources.

Issues Inherent to the Introduction of New Features at the Time of this Application which Make Use of PRACH Resources:

In prior standards releases the RACH capacity and dimensioning hasn't been an issue due to the limited amount of required RACH resources (see FIG. 1, where 3% of the resources are dedicated to RACH);

For more recent standards at the time of this application and onward, separate RACH configurations would have to be introduced to support initial access for the standards features, entailing provisioning an additional set of ROs for one or more these features. This is shown in FIG. 4, where 12% of the radio resources are used in total for RACH to introduce RedCap and slicing;

In addition to legacy RACH resources, the network would need to allocate a sufficient amount of RACH resources for each separate RACH configuration dedicated to one of more standards features at the time of this application. This is in order to ensure that the tolerable collision probability and latency KPIs are within the allowed targets for each feature (e.g., <1% PRACH collision probability); and/or In addition, the network may need to configure both CB RACH resources and CF RACH resources for some of these features (at least for slicing). This means further increasing the required additional RACH resources for such a new feature needing also CF resources.

In conclusion, introducing separate RACH resources/configurations for these standards features results in RACH resource fragmentation. The issue of any resource fragmentation is well known: it leads to resource efficiency degradation, the more severe the larger the fragmentation. This may require to either:

Approach #1: increasing the RACH resource overhead to maintain the same collision probability for each fragmented pool, and in turn to degrading the system performance (bit/Hz), or Approach #2: allocating limited resources for some pool, in order to limit the increase in RACH resource overhead, at the cost of an increased collision probability for the affected pool.

In example embodiments of this invention, it is assumed that, for any feature or features combo that does not suffer from tight initial access latency target, the network may operate according to approach 2. This will result in minimizing the RACH resources overhead increase at the cost of higher collision rate. And so in example embodiments of this invention there is provided means for improved RACH resource utilization in collision scenarios, which would occur more often than in legacy.

In the prior art at the time of this application there is Partitioning RACH resources for a combination of features (rather than on a per feature basis). However, there are many ways to configure a separate RO set to the UE, however, many of them are quite resource expensive and it is unclear how to optimize this.

It has been proposed that whether the particular separate RO configuration is dedicated to a single feature or to a feature combination will depend on how many features or feature combinations are supported in the deployed cell and how many access attempts are expected for a specific feature or feature combination. If the cell supports many features or feature combinations for which RACH partitioning is required, there could be two options to provide ROs for them:
1. Configure a separate RO set (i.e., separate RACH configuration) for each feature or feature combination (see RO set 2 in FIG. 1); and
2. Allow for RO configuration to be shared for multiple features or feature combinations by using a mask index indicating a subset of ROs within the RO set which is applicable to a specific feature or feature combination (see RO set 3 or RO set 4 in FIG. 1)."

Also, discussions on how to bundle different features together, to make them use the same PRACH resources during access, are been carried out in 3GPP.

CF RACH Assignment in 5G NR

At the time of this application, supported operations include that the network can assign CF-RACH resources (typically a specific preamble to use in valid ROs) only to RRC Connected UEs but not to UEs in RRC Inactive/idle. The CF resources can be assigned for different purposes, including obtaining network synchronization to a target cell during handover, obtaining intra-cell re-synchronization, and performing beam failure recovery (BFR). Except for BFR, the network is in control of when the UE will actually use a CF resource within a time window (i.e., the network initiates these procedures via network commands, dedicated DCI or RRC signalling and the UE has to perform the commanded action within a defined time window). This means that for any purpose but BFR, the network can use the CF resources for other UEs unless it has triggered the given UE to use them. In contrast, for BFR, the network has to reserve the CF RACH resources permanently and cannot use them for other purposes despite the fact that the UEs will not use them most of the time, which is not resource efficient. In example embodiments of this invention, there is provided means to leverage the benefits of CF resources but only upon need.

Figure 9:
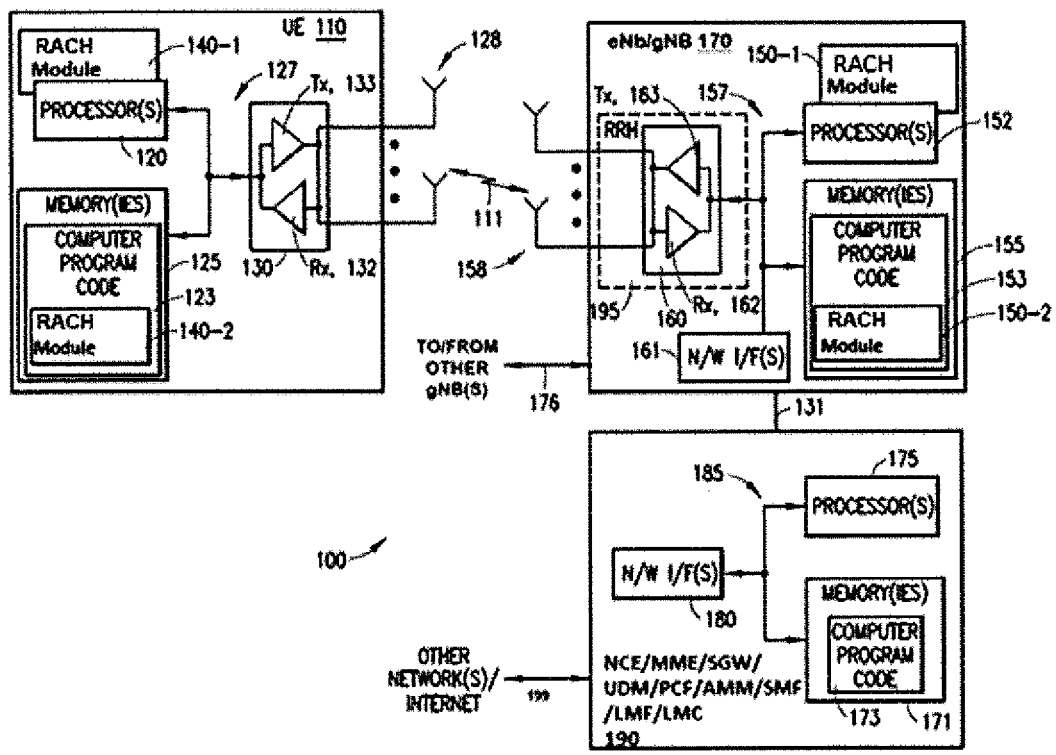
FIG. 9 shows a high level block diagram of various devices used in carrying out various aspects of the invention.

Before describing the example embodiments of the invention in further detail reference is made to FIG. 9. FIG. 9 shows a block diagram of one possible and non-limiting exemplary system in which the exemplary embodiments may be practiced.

As shown in FIG. 9, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include an RACH Module 140 which is configured to perform the example embodiments of the invention as described herein. The RACH Module 140 may be implemented in hardware by itself of as part of the processors and/or the computer program code of the UE 110. The RACH Module 140 comprising one of or both parts 140-1 and/or 140-2, which may be implemented in a number of ways. The RACH Module 140 may be implemented in hardware as RACH Module 140-1, such as being implemented as part of the one or more processors 120. The RACH Module 140-1 may be implemented also as an integrated circuit or through other hardware such as a programmable gate array. In another example, the RACH Module 140 may be implemented as RACH Module 140-2, which is implemented as computer program code 123 and is executed by the one or more processors 120. Further, it is noted that the RACH Modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes an RACH Module 150 which is configured to perform example embodiments of the invention as described herein. The RACH Module 150 may comprise one of or both parts 150-1 and/or 150-2, which may be implemented in a number of ways. The RACH Module 150 may be implemented in hardware by itself or as part of the processors and/or the computer program code of the gNB 170. RACH Module 150-1, such as being implemented as part of the one or more processors 152. The RACH Module 150-1 may be implemented also as an integrated circuit or through other hardware such as a programmable gate array. In another example, the RACH Module 150 may be implemented as RACH Module 150-2, which is implemented as computer program code 153 and is executed by the one or more processors 152. Further, it is noted that the RACH Modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed at the time of this application.

The gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or gNB 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW/UDM/PCF/AMM/SMF/LMF/LMC 190 as in FIG. 9.

It is noted that functionality(ies), in accordance with example embodiments of the invention, of any devices as shown in FIG. 9 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 9 at least via the wireless link 111 and/or via the NCE/MME/SGW/UDM/PCF/AMM/SMF/LMF/LMC 190 using link 199 to Other Network(s)/Internet as in FIG. 9.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions, in addition for vehicles such as autos and/or truck and arial vehicles such as manned or unmanned arial vehicle and as well as portable units or terminals that incorporate combinations of such functions.

In example embodiments of this invention, there is proposed at least a method and apparatus for optimizing the allocation (configuration) of both contention free and contention based random-access channel (RACH) resources to a UE, which are specific to a feature or a feature combination.

Embodiment 1

Allocation of conditional CF RACH (conditional CFRA) resources for Connected mode UEs through dedicated signalling. The conditional aspect is achieved through enabling first the use of a contention based RACH resource and then, if a MSG2 is received at the UE and a timer expires, by allowing the usage of the conditional contention free RACH resource in a second step. This aims at minimizing the RACH resource reservation inefficiency when assigning legacy contention free RACH resources that can be used anytime, i.e., without prior receiving a network command (e.g., CF-resource for BFR).

Embodiment 2

Allocation of additional CB RACH (conditional CBRA) resources with limited contention for Inactive, Idle, or Connected mode UEs through broadcast signalling (SI). We aim at introducing means similar to embodiment 1 for Idle and Inactive UEs, by using a secondary conditional contention based RACH resource set, which is feature specific and has more limited contention than the primary CB RACH resource set, rather than a CF-set as in embodiment 1. The conditional aspect is achieved through enabling first the use of the first (primary) set of contention based RACH resources (e.g., applicable to a features combo such as SDT+RedCap) and then, if a MSG2 is received at the UE and a timer expires allowing the usage of a resource selected from the secondary set of contention based RACH resources having a smaller contention basis. The configuration of such additional/secondary CBRA set should allow to separate the features in the features combo.

Embodiment 3

Activation of the feature-specific conditional CBRA or CFRA resources through (based on) an activation timer configured to the UE by the network (serving cell). The timer should be started upon reception of a network message (e.g., Msg2) and this should allow to activate the resources synchronously at both UE and network.

In accordance with example embodiments of the invention there can be at least:
UE receiving from the network a first CB RACH configuration and a second RACH configuration associated to at least service A, wherein the second RACH configuration is inactive and whose activation is associated with at least one activation timer;
UE transmitting a first PRACH resource using a resource of the first CB RACH configuration;
UE determining collision/failure and activating a resource of the second RACH configuration based on the timer; and
UE transmitting a second PRACH resource using a resource of the second RACH configuration based on the determining.

Further, in accordance with example embodiments of the invention there can be at least:
Wherein the second RACH configuration is associated to service A and service B (feature combination) and wherein the second PRACH resource depends on whether service A or B is to be indicated,
the configuration can be provided by the target node during a handover operation, and
the channel configuration can be a separate PRACH configuration resource configuration and/or can be a separate preamble or RACH occasion configuration.

Figure 5:
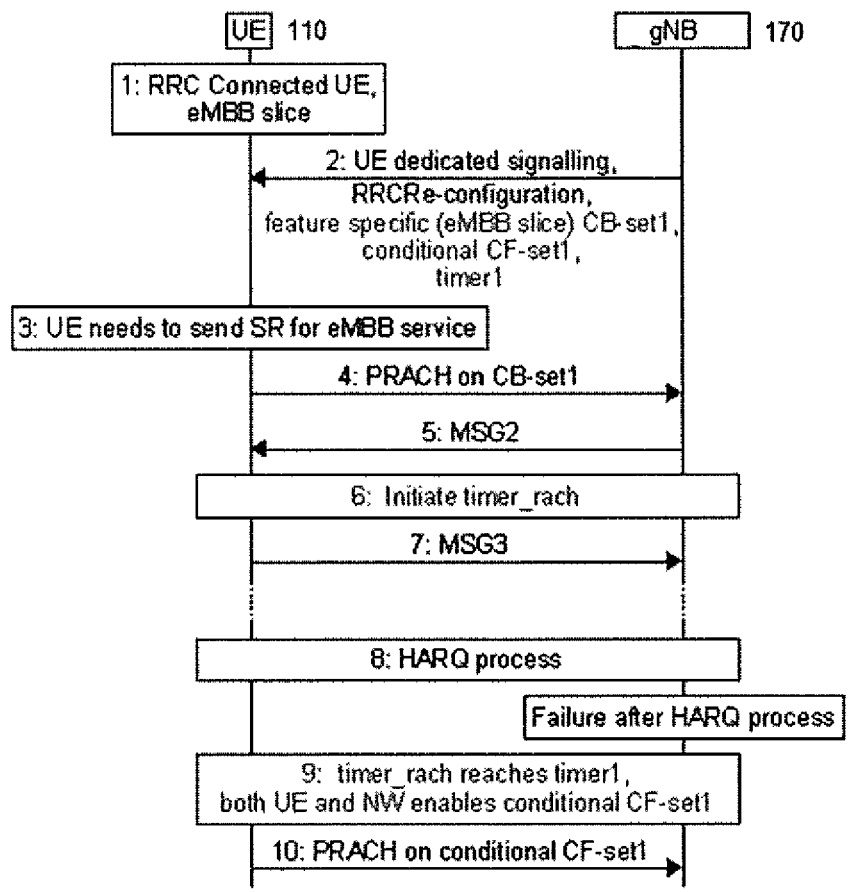
FIG. 5 shows a signalling flow chart in accordance with embodiments 1 and 3 in accordance with example embodiments of the invention.

FIG. 5 shows a signalling flow chart between a UE 110 and a gNB 170 in accordance with embodiments 1 and 3 in accordance with example embodiments of the invention. The gNB 170 can be part of a serving cell.

The steps as shown in FIG. 5 are as follows:
1. UE is RRC Connected state in a cell;
2. UE is configured through dedicated (RRC) signalling by the network with a feature-specific contention based (CB) set of preambles and/or ROs (denoted feature1-CB-set1 or simply CB-set1):
   Additionally, UE is configured with one or more conditional feature-specific contention free (CF) resources (denoted conditional feature1-CF-set or simply CF-set) and with a feature-specific timer that controls when UE is allowed to use the CF-set during an ongoing RACH procedure if it detects collision;
3. UE needs to use PRACH:
   For instance, UE needs to send an SR for eMBB service;
4. UE sends the preamble through CB-set1 resources;
5. UE receives the MSG2:
   In case the UE doesn't receive MSG2, the UE re-transmit the preamble using the same resources;
6. UE will start the feature-specific activation timer (i.e., timer 1) upon receiving a defined network response (e.g., Msg2 of 4-step RACH):
   a. The presence of the network response ensures the synch between the network and UE about the ongoing RACH procedure,
   b. HARQ process following MSG2 transmission failure (procedure) ensures that the MSG2 is either received at the UE side, or the UE can detect if it fails to receive MSG2 and re-start the random-access procedure resetting the timer:
      i. The same argument is not true for MSG3 failure. In case MSG3 failure occurs UE re-tries with re-transmissions but the timer is not reset, and/or
      ii. For RRC Idle/Inactive UEs, UE uses a MSG4 directed for another UE to reset the timer and restart the process;
7. If the UE detects RACH collision:
   a. RACH collision is defined as:
      i. For RRC Connected UEs, not receiving a MSG4 after the transmission of a MSG3 in 4-step RACH before the activation timer expires (activation timer is configured large enough to ensure that HARQ procedure would fall into it). (This would not happen if the HARQ procedure for MSG3 succeeds),
   b. UE activates the CF-set at the timer expiry and will perform a new PRACH transmission using a resource in the activated CF-set,
   c. The network will also activate the CF-set whenever it detects a RACH procedure that made use of resources belonging to the CB-set1 and will start monitoring for any resource in the CF-set, where the monitoring starts from the Msg2 transmission time+ activation timer:
      The CF-set activation at the network can be blind irrespective of whether collision occurred as the network may not be able to determine whether there was any collision, and/or
      The activation and corresponding monitoring can be limited for a defined time window;
   The network will monitor for any CF resource configured to UEs that is configured for feature 1 as if it is not able to identify which UE may have experienced collision:
      Network may use the indication of a specific CB preamble or RO used to limit which CF-set needs to be activated. (Otherwise, it is unaware of which specific resource in the CF-set may be used);
d. As a result, both the UE and NW activates the CF-RACH resource(s) (for a defined period) after the configured timer expires.
   This entails that the network can use the PUSCH resources—assigned as conditional CF-RACH resources—for different purposes/different UEs unless the CF-set is activated for the defined period;
8. PRACH re-transmission is done over the conditional CF-RACH resource FIG. 6 shows a signalling flow chart in accordance with embodiments 2 and 3 in accordance with example embodiments of the invention.

Figure 6:
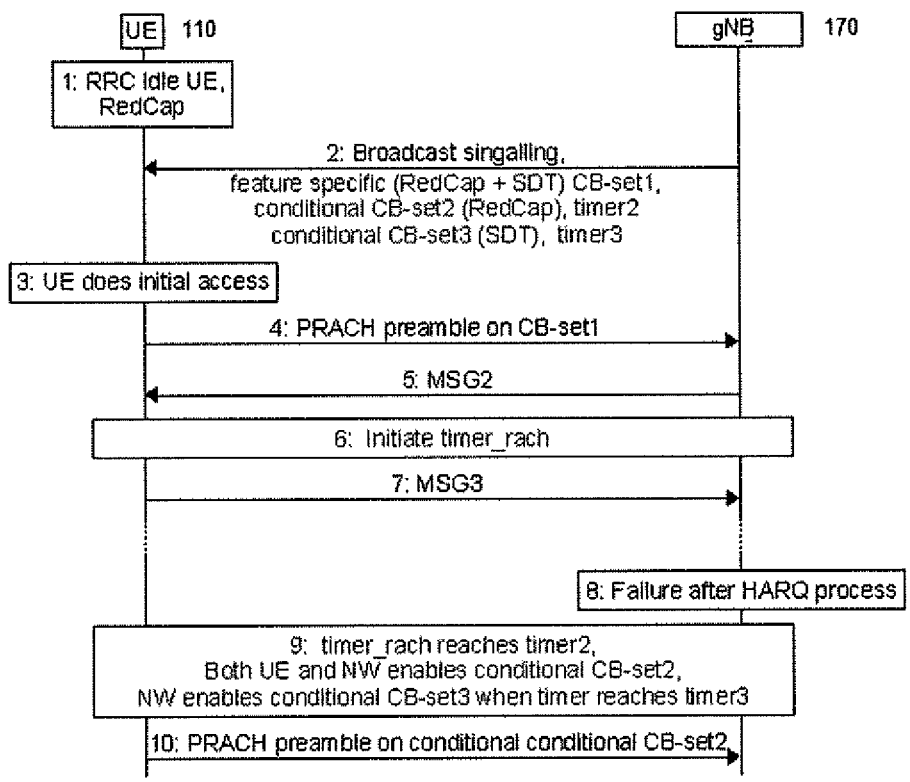
FIG. 6 shows a signalling flow chart in accordance with embodiments 2 and 3 in accordance with example embodiments of the invention.

The steps as shown in FIG. 6 are as follows:
1. UE can be in any RRC State, in this example UE is assumed in RRC Idle state and is supporting a R17 feature e.g., RedCap and SDT;
2. UE requiring feature 1 (RedCap) is configured (through broadcast) by the network with a feature-combo (e.g., feature1+feature2 (RedCap+SDT)) specific contention based (CB) set of preambles and/or ROs (denoted CB-set1):
   Additionally, UE is configured with an additional feature specific conditional contention based (CB) (denoted CB-set2) and with a feature 1-specific timer2 (denoted timer2) that controls when UE is allowed to use the CB-set2 during an ongoing RACH procedure if it detects collision,
   Note that a UE2 requiring feature 2 will be configured with the same CB-set1:
      i. The UE2 may be configured with a third contention based set of preambles CB-set 3,
      ii. The UE2 may be also configured with the same CB-set2 and feature 2-specific timer 2 (denoted timer2). timer2 and timer3 are assigned such that CB-set2 can be used only by a feature 1 or feature 2 UE at a given time to disaggregate the combo;
3. UE needs to use PRACH:
   a. For instance, UE needs to send an SR for eMBB service;
4. UE sends the preamble through CB-set1 resources;
5. UE receives the MSG2;
6. After initiating a RACH procedure using a resource of CB-set1, the UE will start the timer upon receiving a defined network response (e.g., Msg2 of 4-step RACH):
   c. The presence of the network response ensures the synch between the network and UE about an ongoing RACH procedure,
   d. It is assumed that HARQ process for MSG2 covers the MSG2 reception at the UE side, and UE can detect if it fails to receive MSG2 and re-start the random-access procedure resetting the timer:
      i. The same argument is not true for MSG3 failure. In case MSG3 failure occurs UE re-tries with re-transmissions but keep the timer, and/or
      ii. For RRC Idle/Inactive UEs UE may use a MSG4 directed for another UE to reset the timer and restart the process. (Details are explained in section 6);
9. If the timer expires:
   a. For RRC Idle/Inactive UEs, a MSG4 is not received at all after the transmission of a MSG3 in 4-step RACH, this would not happen if the HARQ procedure for MSG3 succeeds. And the timer would be running
      i. In case UE receives a MSG4 directed to another UE, UE resets the timer,
   b. UE activates either the conditional CB-set2 or CB-set3 depending on service that triggered the procedure at the corresponding timer expiry and will switch to perform a new PRACH transmission using a resource in the activated CB-set,
   c. The network will activate both the CB-set2 and CB-set3 whenever it detects a RACH procedure that made use of resources belonging to the CB-set1 and will start monitoring for any resource in the CB-set2 and CB-set3, where the monitoring starts from the Msg2 transmission time+activation timer:
      The CB-set activation can be blind irrespective of whether collision occurred as the network may not be able to determine whether there was any collision,
      The CB-set activation may be limited to collision detection:
         For RRC Idle/Inactive UEs, if a MSG4 is received for the random attempt of another UE during the RA procedure, UE resets the timer,
         The network may also reset the timer whenever it sends a Contention resolution message,
         This option will not work if RRC Connected and RRC Idle/Inactive UEs share the same PRACH resources;
      The network will monitor for any CB resource configured to UEs that is configured for to possibly use the preamble of feature 1 as if it is not able to identify which UE has experienced collision:
         Network may use the indication of a specific CB preamble or RO used to limit which CB-set needs to be activated. (Otherwise, it is unaware of which specific resource in the CB-set may be used),
   d. As a result, both the UE and NW activates the CB-RACH resource (for a defined period) after the configured timer expires:
      This entails that the network can use the PUSCH resources—assigned as conditional CB-RACH resources—for different purposes/different UEs unless it is activated for the defined period; and
10. PRACH re-transmission is done over the conditional CB-set2 resource In the examples herein it is specified how CB-set1 can be implement as only a preamble in each RO is mapped to a specific feature CB-set1. This is useful to clarify that the CB-set2 or CF-set1 is more resource efficient to enable conditionally. As only a single preamble are used per CB-set1, UE can support many features without dedicating too many resources.

Figure 7:
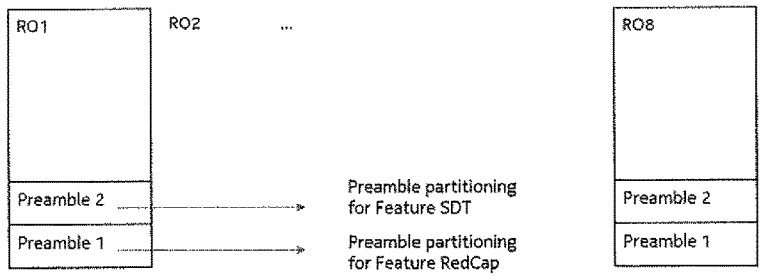
FIG. 7 shows an illustration of the first feature specific CB PRACH configuration.

FIG. 7 shows an illustration of the first feature specific static CB PRACH configuration.

FIG. 7 illustrates how would the static feature specific PRACH configuration will look like. As shown in FIG. 7 RedCap UEs will be informed about a special preamble in the existing ROs of PRACH configuration, e.g., preamble 1 in the example, and can use this preamble to access the cell. However, as the network doesn't know from which beam the UEs will come, the network has to do the preamble allocation on all ROs for all beams for the feature.

Figure 8:
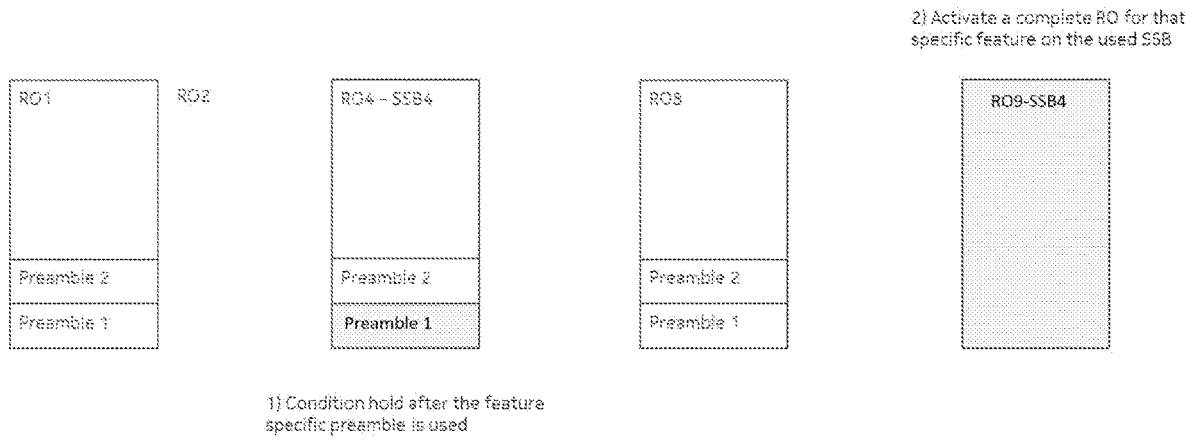
FIG. 8 shows an illustration of the second feature specific CB/CF PRACH configuration that is enabled after the expiration of a timer.

FIG. 8 shows an illustration of the second feature specific CB/CF PRACH configuration that is enabled after the expiration of a timer.

FIG. 8 illustrates how would the second feature specific PRACH configuration will be activated. RedCap UEs will be informed about a special preamble in the existing ROs of PRACH configuration. In case the network and the UE synchronously detect, a timer has expired after the transmission/reception of a network message, they both activate in PRACH configuration the RO9. RO9 is specific for SSB4. All UEs that used preamble 1 in RO4, can try to access RO9 for SSB4. If at the same time there are other RedCap UEs using other ROs with preamble 1, further ROs may be activated. In this example 64 preambles in second RACH/RO is allocated for RedCap UEs, but the number of preambles in a second RACH/RO can be specified separately for RRC Idle/Inactive UEs and RRC Connected UEs. For RRC Idle and Inactive UEs the mapping can be done with respect to feature specific RACH load. For RRC Connected UEs, each UE will be allocated a preamble for contention free RA scenario so the number of preambles in second RACH/RO is indicated by the number of RRC Connected UEs in a specific feature.

Figure 10A:
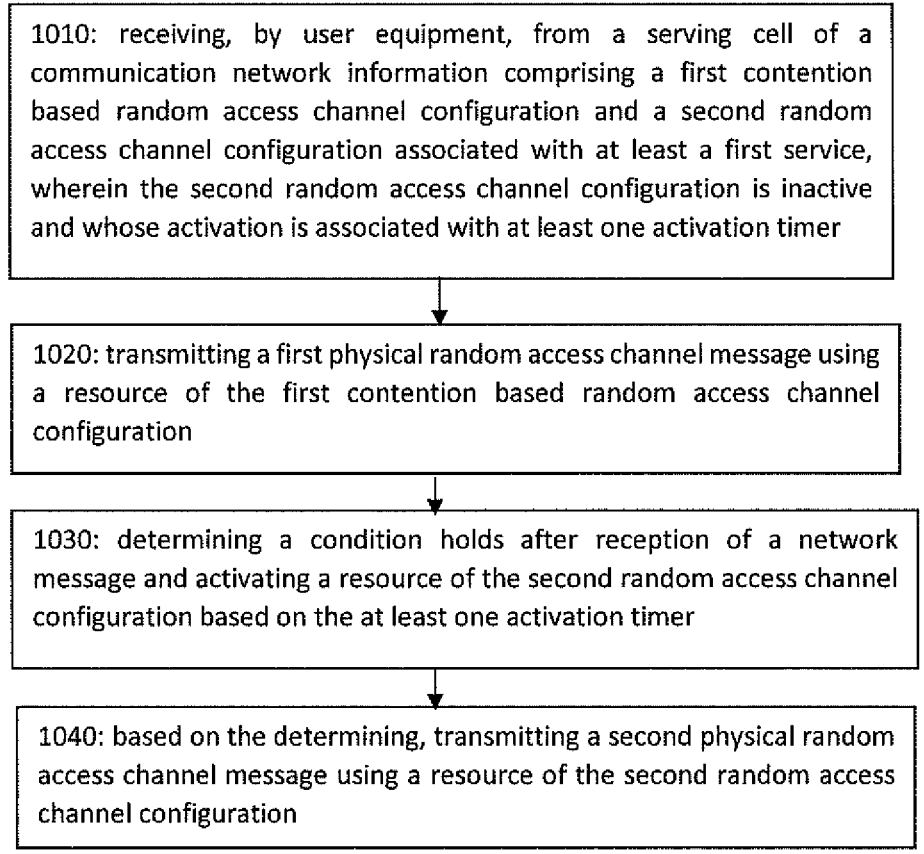
FIG. 10A and FIG. 10B each show a method in accordance with example embodiments of the invention which may be performed by an apparatus.
Figure 10B:
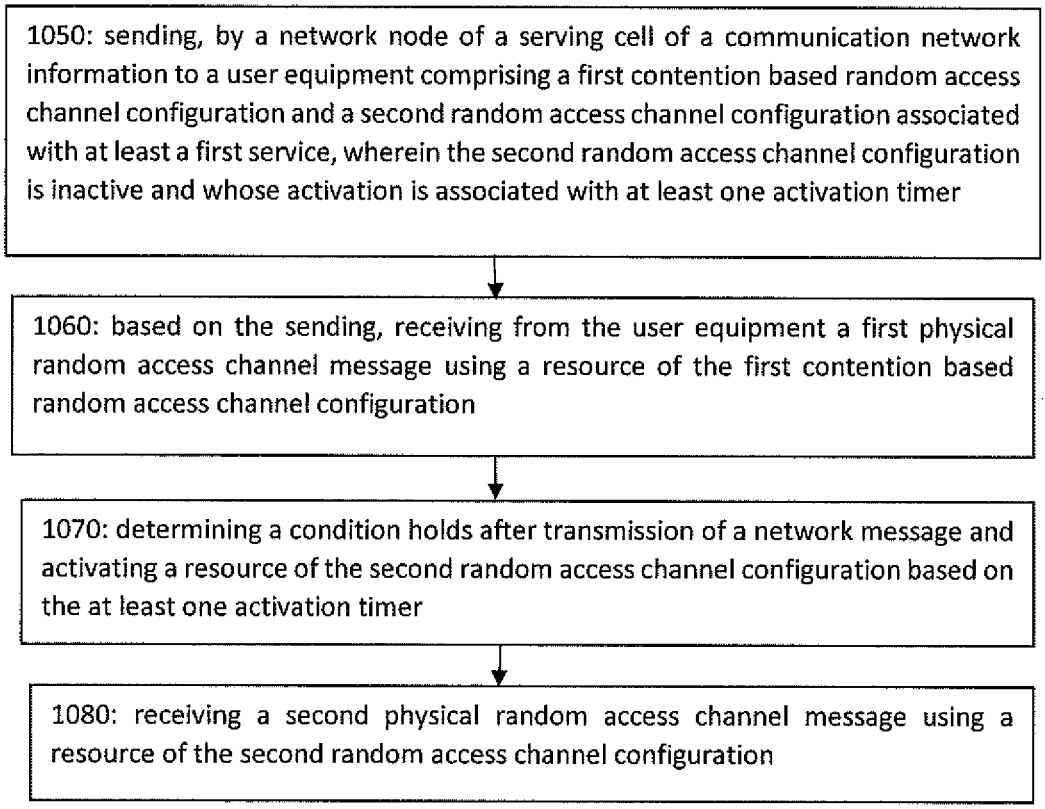

FIG. 10A and FIG. 10B each show a method in accordance with example embodiments of the invention which may be performed by an apparatus.

FIG. 10A illustrates operations which may be performed by a device such as, but not limited to, a device (e.g., the UE 110 as in FIG. 9). As shown in step 1010 of FIG. 10A there is receiving, by user equipment, from a serving cell of a communication network information comprising a first contention based random access channel configuration and a second random access channel configuration associated with at least a first service, wherein the second random access channel configuration is inactive and whose activation is associated with at least one activation timer. As shown in step 1020 of FIG. 10A there is transmitting a first physical random access channel message using a resource of the first contention based random access channel configuration. As shown in step 1030 of FIG. 10A there is determining a condition holds after reception of a network message and activating a resource of the second random access channel configuration based on the at least one activation timer. Then as shown in step 1040 of FIG. 10A there is, based on the determining, transmitting a second physical random access channel message using a resource of the second random access channel configuration.

In accordance with the example embodiments as described in the paragraph above, wherein determining the condition is based on at least one of a collision detection, random access channel failure and a reception of the network message.

In accordance with the example embodiments as described in the paragraphs above, wherein the network message is one of a random access response and a contention resolution message.

In accordance with the example embodiments as described in the paragraphs above, wherein the second random access channel configuration comprises at least one of a contention based resource set or a contention free resource set.

In accordance with the example embodiments as described in the paragraphs above, wherein the contention based resource set comprises at least one of a contention based resource for reduced capability new radio resource, contention based resource for slice specific transmission resource, contention based resource for coverage enhancement transmission resource and contention based resource for small data transmission resource.

In accordance with the example embodiments as described in the paragraphs above, wherein based on the condition the at least one activation timer controls when the user equipment is allowed to use the first contention based random access channel configuration and the second random access channel configuration associated with at least a first service.

In accordance with the example embodiments as described in the paragraphs above, wherein the determining is based on an expiration of the at least one activation timer.

In accordance with the example embodiments as described in the paragraphs above, wherein the at least one activation timer comprises at least one of a first activation timer, a second activation timer, and a third activation timer.

In accordance with the example embodiments as described in the paragraphs above, wherein based on the first activation timer expiring the user equipment enables the contention free resource set.

In accordance with the example embodiments as described in the paragraphs above, wherein based on the second activation timer expiring the user equipment enables a second contention based resource set.

In accordance with the example embodiments as described in the paragraphs above, wherein the enabling of the second contention based or the contention free resource set is limited to a beam indicated by a first contention based resource used.

In accordance with the example embodiments as described in the paragraphs above, wherein the information is received via one of dedicated signalling or broadcast signalling.

In accordance with the example embodiments as described in the paragraphs above, wherein the at least one activation timer is reset if the user equipment receives from the network an indication that there was no collision in a radio resource control connected state.

In accordance with the example embodiments as described in the paragraphs above, wherein the at least one activation timer is reset if the user equipment receives from the network an indication that contention resolution is for another user equipment in a radio resource control idle state.

In accordance with the example embodiments as described in the paragraphs above, wherein the first contention based random access channel configuration and the second random access channel configuration are related to at least two services.

In accordance with the example embodiments as described in the paragraphs above, wherein the network message is indicating a condition can come with the second random access channel configuration and a timer.

In accordance with the example embodiments as described in the paragraphs above, wherein the network message is indicating a condition to be evaluated and a second set of random access channel resources to be used.

A non-transitory computer-readable medium (Memory(ies) 125 of FIG. 9) storing program code (Computer Program Code 123 and/or RACH Module 140-2 as in FIG. 9), the program code executed by at least one processor (Processor(s) 120 and/or RACH Module 140-1 as in FIG. 9) to perform the operations as at least described in the paragraphs above.

In accordance with example embodiments of the invention as at least described in the paragraphs above there are methods and an apparatus to include at least means for receiving (one or more transceivers 130, Memory(ies) 125, Computer Program Code 123 and/or RACH Module 140-2, and Processor(s) 120 and/or RACH Module 140-1 as in FIG.

9), by user equipment (UE 110 S IN FIG. 9), from a serving cell of a communication network (Network 100 as in FIG. 9) information comprising a first contention based random access channel configuration and a second random access channel configuration associated with at least a first service, wherein the second random access channel configuration is inactive and whose activation is associated with at least one activation timer; means for transmitting (one or more transceivers 130, Memory(ies) 125, Computer Program Code 123 and/or RACH Module 140-2, and Processor(s) 120 and/or RACH Module 140-1 as in FIG. 9) a first physical random access channel message using a resource of the first contention based random access channel configuration; means for determining (one or more transceivers 130, Memory(ies) 125, Computer Program Code 123 and/or RACH Module 140-2, and Processor(s) 120 and/or RACH Module 140-1 as in FIG. 9) a condition holds and activating a resource of the second random access channel configuration based on the at least one activation timer; and means, based on the determining, for transmitting (one or more transceivers 130, Memory(ies) 125, Computer Program Code 123 and/or RACH Module 140-2, and Processor(s) 120 and/or RACH Module 140-1 as in FIG. 9) a second physical random access channel message using a resource of the second random access channel configuration In the example aspect of the invention according to the paragraph above, wherein at least the means for receiving, transmitting, and determining comprises a non-transitory computer readable medium [Memory(ies) 125 as in FIG. 9] encoded with a computer program [Computer Program Code 123 and/or RACH Module 140-2 as in FIG. 9] executable by at least one processor [Processor(s) 120 and/or RACH Module 140-1 as in FIG. 9].

FIG. 10B illustrates operations which may be performed by a network device such as, but not limited to, a network node eNB/gNB 170 as in FIG. 2 or a base station. As shown in step 1050 of FIG. 10B there is sending, by a network node of a serving cell of a communication network information to a user equipment comprising a first contention based random access channel configuration and a second random access channel configuration associated with at least a first service, wherein the second random access channel configuration is inactive and whose activation is associated with at least one activation timer. As shown in step 1060 of FIG. 10B there is, based on the sending, receiving from the user equipment information comprising a first physical random access channel message using a resource of the first contention based random access channel configuration. As shown in step 1070 of FIG. 10B determining a condition holds after transmission of a network message and activating a resource of the second random access channel configuration based on the at least one activation timer. Then as shown ins step 1080 of FIG. 10B there is, receiving a second physical random access channel message using a resource of the second random access channel configuration.

In accordance with the example embodiments as described in the paragraph above, wherein the condition is based on at least one of a collision detection, random access channel failure and the transmission of the network message by the network node.

In accordance with the example embodiments as described in the paragraphs above, wherein the network message is one of a random access response and a contention resolution message.

In accordance with the example embodiments as described in the paragraphs above, wherein the second random access channel configuration comprises at least one of a contention based resource set or a contention free resource set.

In accordance with the example embodiments as described in the paragraphs above, wherein the contention based resource set comprises at least one of a contention based resource for reduced capability new radio resource, contention based resource for slice specific transmission resource, contention based resource for coverage enhancement transmission resource and contention based resource for small data transmission resource.

In accordance with the example embodiments as described in the paragraphs above, wherein based on the condition the at least one activation timer controls when the user equipment is allowed to use the first contention based random access channel configuration and the second random access channel configuration associated with at least a first service.

In accordance with the example embodiments as described in the paragraphs above, wherein the determining is based on an expiration of the at least one activation timer.

In accordance with the example embodiments as described in the paragraphs above, wherein the at least one activation timer comprises at least one of a first activation timer, a second activation timer, and a third activation timer.

In accordance with the example embodiments as described in the paragraphs above, wherein the indication is received by the user equipment is based on an expiration of the at least one activation timer.

In accordance with the example embodiments as described in the paragraphs above, wherein the information is sent via one of dedicated signalling or broadcast signalling.

In accordance with the example embodiments as described in the paragraphs above, wherein the first contention based random access channel configuration and the second random access channel configuration are related to at least two services.

In accordance with the example embodiments as described in the paragraphs above, wherein the network message is indicating a condition can come with the second random access channel configuration and a timer.

In accordance with the example embodiments as described in the paragraphs above, wherein the information is indicating a condition to be evaluated and a second set of random access channel resources to be used.

A non-transitory computer-readable medium (Memory(ies) 155 of FIG. 9) storing program code (Computer Program Code 153 and/or RACH Module 150-2 as in FIG. 9), the program code executed by at least one processor (Processor(s) 152 and/or RACH Module 150-1 as in FIG. 9) to perform the operations as at least described in the paragraphs above.

In accordance with an example embodiment of the invention as described above there is an apparatus comprising: means for sending (one or more transceivers 160, Memory(ies) 155, Computer Program Code 153 and/or RACH Module 150-2, and Processor(s) 120 and/or RACH Module 150-1 as in FIG. 9), by a network node (eNB/gNB 170 as in FIG. 9) of a serving cell of a communication network (network 100 as in FIG. 9) information to a user equipment comprising a first contention based random access channel configuration and a second random access channel configuration associated with at least a first service, wherein the second random access channel configuration is inactive and whose activation is associated with at least one activation timer; means, based on the sending, receiving (one or more transceivers 160, Memory(ies) 155, Computer Program Code 153 and/or RACH Module 150-2, and Processor(s) 120 and/or RACH Module 150-1 as in FIG. 9) from the user equipment information comprising a first physical random access channel message using a resource of the first contention based random access channel configuration; means for determining a condition holds after transmission (one or more transceivers 160, Memory(ies) 155, Computer Program Code 153 and/or RACH Module 150-2, and Processor(s) 120 and/or RACH Module 150-1 as in FIG. 9) of a network message and activating (one or more transceivers 160, Memory(ies) 155, Computer Program Code 153 and/or RACH Module 150-2, and Processor(s) 120 and/or RACH Module 150-1 as in FIG. 9) a resource of the second random access channel configuration based on the at least one activation timer; and means, for receiving (one or more transceivers 160, Memory(ies) 155, Computer Program Code 153 and/or RACH Module 150-2, and Processor(s) 120 and/or RACH Module 150-1 as in FIG. 9) a second physical random access channel message using a resource of the second random access channel configuration.

In the example aspect of the invention according to the paragraph above, wherein at least the means for sending, receiving, and determining comprises a non-transitory computer readable medium [Memory(ies) 155 as in FIG. 9] encoded with a computer program [Computer Program Code 153 and/or RACH Module 150-2 as in FIG. 9] executable by at least one processor [Processor(s) 152 and/or RACH Module 150-1 as in FIG. 9].

Advantages of the Invention

This invention allows to assign second RACH/ROs in time, to different features, enabling efficient PRACH resource provisioning to multiple features. The ROs are enabled only based on need. In case the enabling of a set of ROs dedicated for a feature, is not there, the resource grid would be filled with many feature specific preambles whether that is contention free and contention based.

The conditional CFRA allows to minimize the reservation of CF resources, which increases the resource efficiency at a small cost of latency. Such latency cost can be tolerated for many use cases and features.

Compared to using regular CBRA resources upon RACH collision/failure, the use of the conditional CBRA allows to minimize the latency associated to the collision/failure since a higher likelihood for RACH success can be achieved by using the conditional resources due to their more limited contention properties. Also it allows to separate features that were in the first stage bundled together in a feature combo, so that these features cannot create collision to each other.

In accordance with example embodiments of the invention as disclosed in this application this application, the "circuitry" provided can include at least one or more or all of the following:
  (a) hardware-only circuit implementations (such as implementations in only analog and/or digital circuitry);
  (b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
  (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
  (a) hardware-only circuit implementations (such as implementations in only analog and/or digital circuitry); and
  (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
  (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor and
   at least one memory storing instructions that, when executed by the at least one processor, cause the apparatus at least to:
   receive from a serving cell of a communication network information comprising a first contention based random access channel configuration and a second random access channel configuration associated with at least a first service, wherein the second random access channel configuration is inactive and whose activation is associated with at least one activation timer;
   transmit a first physical random access channel message using a resource of the first contention based random access channel configuration;
   determine a condition holds after reception of a network message and activating a resource of the second random access channel configuration based on the at least one activation timer; and
   based on the determining, transmit a second physical random access channel message using a resource of the second random access channel configuration.

2. The apparatus of claim 1, wherein determining the condition is based on at least one of a collision detection, random access channel failure or a reception of the network message.

3. The apparatus of claim 1, wherein the network message is one of a random access response or a contention resolution message.

4. The apparatus of claim 1, wherein the second random access channel configuration comprises at least one of a contention based resource set or a contention free resource set.

5. The apparatus of claim 4, wherein the contention based resource set comprises at least one of a contention based resource set comprises contention based resource for reduced capability new radio resource, contention based resource for slice specific transmission resource, contention based resource for coverage enhancement transmission resource or contention based resource for small data transmission resource.

6. The apparatus of claim 1, wherein based on the condition the at least one activation timer controls when the apparatus is allowed to use the first contention based random access channel configuration and the second random access channel configuration associated with at least a first service.

7. The apparatus of claim 1, wherein the determining is based on an expiration of the at least one activation timer.

8. The apparatus of claim 1, wherein the at least one activation timer comprises at least one of a first activation timer, a second activation timer, or a third activation timer.

9. The apparatus of claim 8, wherein the instructions, when executed by the at least one processor, further cause the apparatus at least to:
   enable the contention free resource set based on the first activation timer expiring.

10. The apparatus of claim 8, wherein the instructions, when executed by the at least one processor, further cause the apparatus at least to:
    enable a second contention based resource set based on the second activation timer expiring.

11. The apparatus of claim 1, wherein the at least one activation timer is reset if the apparatus receives from the network an indication that:
    there was no collision in a radio resource control connected state, or contention resolution is for another apparatus in a radio resource control idle state.

12. The apparatus of claim 1, wherein the first contention based random access channel configuration and the second random access channel configuration are related to at least two services.

13. The apparatus of claim 1, wherein the network message is indicating at least one of:
    a condition can come with the second random access channel configuration and a timer; or
    a condition to be evaluated and a second set of random access channel resources to be used.

14. An apparatus comprising:
    at least one processor and
    at least one memory storing instructions that, when executed by the at least one processor, cause the apparatus at least to:
    send, by a network node of a serving cell of a communication network information to a user equipment comprising a first contention based random access channel configuration and a second random access channel configuration associated with at least a first service, wherein the second random access channel configuration is inactive and whose activation is associated with at least one activation timer;
    based on the sending, receive from the user equipment a first physical random access channel message using a resource of the first contention based random access channel configuration;
    determine a condition holds after transmission of a network message and activating a resource of the second random access channel configuration based on the at least one activation timer; and
    receive a second physical random access channel message using a resource of the second random access channel configuration.

15. The apparatus of claim 14, wherein the condition is based on at least one of a collision detection, random access channel failure or the transmission of the network message.

16. The apparatus of claim 14, wherein the second random access channel configuration comprises at least one of a contention based resource set or a contention free resource set.

17. The apparatus of claim 14, wherein the determining is based on an expiration of the at least one activation timer.

18. The apparatus of claim 14, wherein the at least one activation timer comprises at least one of a first activation timer, a second activation timer, or a third activation timer.

19. The apparatus of claim 14, wherein the first contention based random access channel configuration and the second random access channel configuration are related to at least two services.

20. The apparatus of claim 14, wherein the network message is indicating at least one of:
- a condition can come with the second random access channel configuration and a timer; or
- a condition to be evaluated and a second set of random access channel resources to be used.

* * * * *